(12) United States Patent
Sun et al.

(10) Patent No.: US 8,454,053 B2
(45) Date of Patent: Jun. 4, 2013

(54) ENERGY ABSORBING STRUCTURE FOR VEHICLE KNEE BOLSTER COVER

(75) Inventors: Haoliang Michael Sun, Rochester Hills, MI (US); Erik Garland, Royal Oak, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 329 days.

(21) Appl. No.: 12/712,445

(22) Filed: Feb. 25, 2010

(65) Prior Publication Data

US 2011/0204608 A1 Aug. 25, 2011

(51) Int. Cl.
*B60R 21/045* (2006.01)

(52) U.S. Cl.
USPC .......................................... 280/752; 280/751

(58) Field of Classification Search
USPC ....................... 280/751, 752, 730.1
See application file for complete search history.

(56) References Cited

U.S. PATENT DOCUMENTS

| | | | | |
|---|---|---|---|---|
| 3,088,539 A | * | 5/1963 | Mathues et al. ................ 180/90 |
| 4,321,989 A | * | 3/1982 | Meinzer ........................ 188/377 |
| 4,413,856 A | * | 11/1983 | McMahan et al. ....... 296/187.03 |
| 4,856,833 A | * | 8/1989 | Beekman ..................... 293/120 |
| 5,098,124 A | * | 3/1992 | Breed et al. .................. 280/751 |
| 5,370,417 A | | 12/1994 | Kelman et al. |
| 5,399,406 A | * | 3/1995 | Matsuo et al. ................. 428/57 |
| 5,431,442 A | * | 7/1995 | Tomita et al. ................ 280/752 |
| 5,518,270 A | | 5/1996 | Hanada et al. |
| 5,518,802 A | * | 5/1996 | Colvin et al. ................. 428/178 |
| 5,573,272 A | * | 11/1996 | Teshima ........................ 280/751 |
| 5,584,509 A | * | 12/1996 | Tekelly et al. ................ 280/750 |
| 5,641,195 A | * | 6/1997 | Patel et al. ............... 296/187.05 |
| 5,731,062 A | * | 3/1998 | Kim et al. ...................... 428/175 |
| 5,806,889 A | * | 9/1998 | Suzuki et al. ................. 280/748 |
| 5,934,730 A | * | 8/1999 | Yagishita et al. ............. 296/39.1 |
| 5,951,045 A | | 9/1999 | Almefelt et al. |
| 6,036,251 A | * | 3/2000 | Yagishita et al. ............. 296/39.1 |
| 6,080,463 A | * | 6/2000 | Togawa et al. ................ 428/120 |
| 6,099,055 A | * | 8/2000 | Hirota et al. .................. 293/120 |
| 6,186,546 B1 | | 2/2001 | Uhl |
| 6,217,061 B1 | * | 4/2001 | Harland et al. ............. 280/730.2 |
| 6,221,930 B1 | * | 4/2001 | Tada et al. ..................... 521/155 |
| 6,270,131 B1 | * | 8/2001 | Martinez et al. .............. 293/132 |
| 6,474,687 B2 | | 11/2002 | Cappabianca et al. |
| 6,619,689 B2 | * | 9/2003 | Spencer et al. ............. 280/730.1 |
| 6,705,653 B2 | * | 3/2004 | Gotanda et al. ............... 293/132 |

(Continued)

FOREIGN PATENT DOCUMENTS

JP 62029459 A * 2/1987

*Primary Examiner* — Nicole Verley
(74) *Attorney, Agent, or Firm* — Shook Hardy & Bacon LLP

(57) ABSTRACT

An energy absorbing panel assembly for the interior of a motor vehicle is disclosed. The energy absorbing panel assembly, typically the knee bolster panel adjacent the steering wheel, includes an energy absorbing structure integrally molded to the panel. The energy absorbing structure includes three outer side walls and a top wall. The outer side walls extend from the same side of the top wall to the panel. Extending from the top wall to the panel is at least one top wall supporting rib. The rib is positioned between the outer side walls. At least one of the outer walls is at an obtuse angle relative to the plane of the top wall. All three of the outer walls may be at an obtuse angle relative to the plane of the top wall. Lateral supports may be provided between the outer side walls and the panel.

15 Claims, 4 Drawing Sheets

U.S. PATENT DOCUMENTS

| | | | |
|---|---|---|---|
| 6,752,450 B2* | 6/2004 | Carroll et al. | 296/187.03 |
| 6,783,156 B2* | 8/2004 | Chickmenahalli et al. | 280/752 |
| 6,786,524 B2* | 9/2004 | Tamura | 296/37.12 |
| 6,808,206 B2* | 10/2004 | Yata et al. | 280/751 |
| 6,974,152 B2* | 12/2005 | Hanjono | 280/728.3 |
| 7,093,866 B2* | 8/2006 | Toneatti et al. | 293/133 |
| 7,201,434 B1* | 4/2007 | Michalak et al. | 296/187.05 |
| 7,240,919 B2* | 7/2007 | Tajima et al. | 280/751 |
| 7,291,378 B2* | 11/2007 | Cowelchuk et al. | 428/140 |
| 7,311,327 B2 | 12/2007 | Yamazaki | |
| 7,360,822 B2* | 4/2008 | Carroll et al. | 296/187.03 |
| 7,404,593 B2* | 7/2008 | Cormier et al. | 296/187.03 |
| 7,413,237 B2* | 8/2008 | Heinze et al. | 296/146.7 |
| 7,481,457 B2* | 1/2009 | Best et al. | 280/752 |
| 7,484,792 B2* | 2/2009 | Penner | 296/187.05 |
| 7,513,344 B2* | 4/2009 | Toccalino et al. | 188/371 |
| 7,513,528 B2* | 4/2009 | Penner | 280/752 |
| 7,735,865 B2* | 6/2010 | Cappabianca et al. | 280/752 |
| 7,810,602 B2* | 10/2010 | Evans | 180/274 |
| 7,810,869 B2* | 10/2010 | Taracko | 296/187.05 |
| 7,842,378 B2* | 11/2010 | Harada et al. | 428/292.1 |
| 7,866,716 B2* | 1/2011 | Perucca et al. | 293/133 |
| 7,874,587 B2* | 1/2011 | Miki et al. | 280/752 |
| 7,992,895 B2* | 8/2011 | Roychoudhury et al. | 280/732 |
| 8,029,041 B2* | 10/2011 | Hall et al. | 296/146.6 |
| 8,056,962 B2* | 11/2011 | Tauchi et al. | 296/187.05 |
| 8,157,309 B2* | 4/2012 | Ishikawa | 296/1.08 |
| 2001/0054811 A1* | 12/2001 | Spencer et al. | 280/730.1 |
| 2001/0054814 A1* | 12/2001 | Yata et al. | 280/751 |
| 2002/0017805 A1* | 2/2002 | Carroll et al. | 296/189 |
| 2005/0098996 A1 | 5/2005 | Enders | |
| 2006/0038390 A1 | 2/2006 | Cho | |
| 2006/0232055 A1* | 10/2006 | Cappabianca et al. | 280/752 |
| 2009/0315308 A1* | 12/2009 | Beau | 280/751 |

* cited by examiner

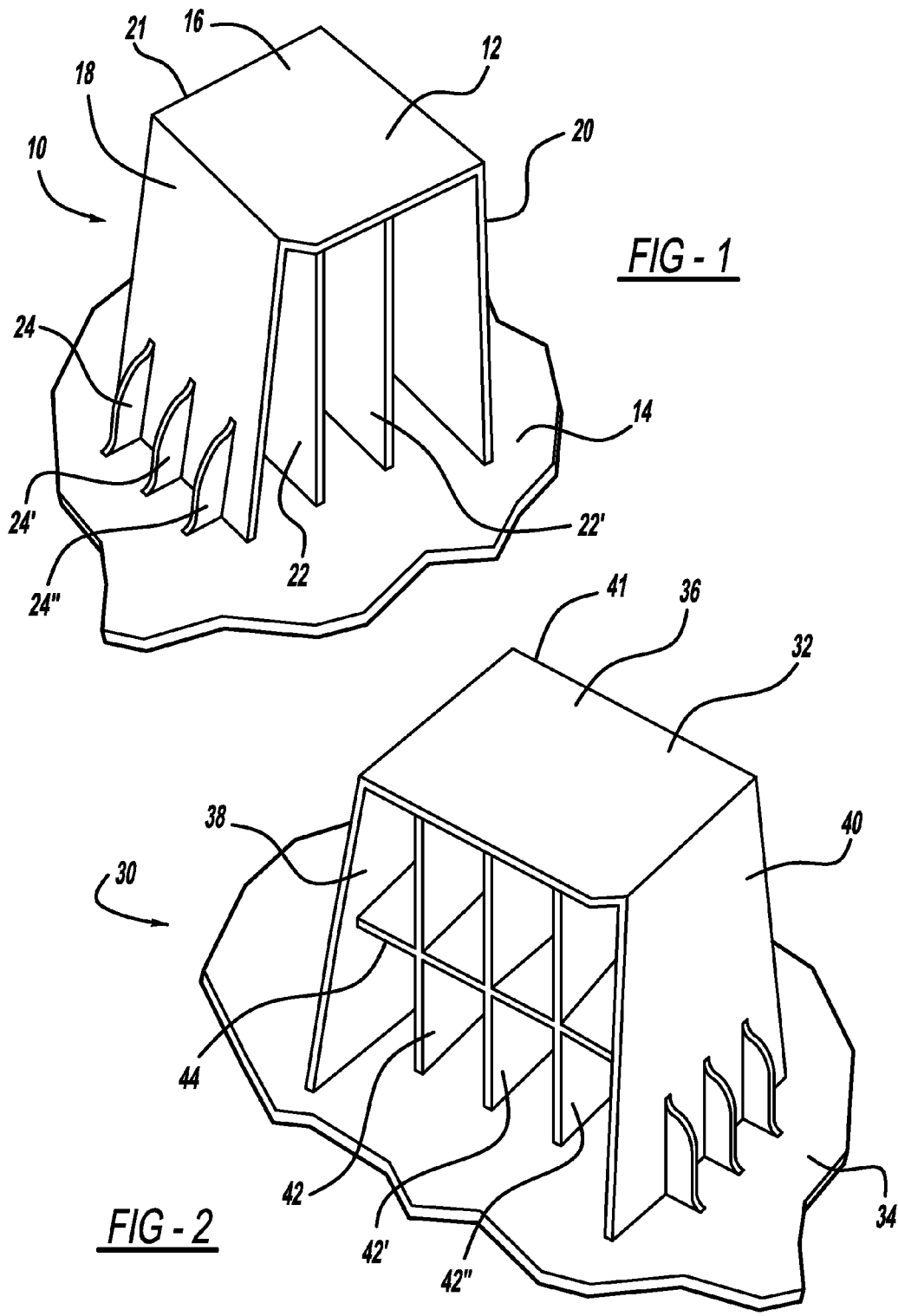

ENERGY ABSORBING STRUCTURE FOR VEHICLE KNEE BOLSTER COVER

TECHNICAL FIELD

The disclosed invention relates to energy absorbing structures for interior panels of vehicles. More particularly, the disclosed invention relates to a structure having energy absorbing ribbing that is molded to the back side of the interior panel. The energy absorbing structure of the disclosed invention is particularly adapted for use in knee bolster covers for vehicles for attachment to the cross-car beam energy absorbing brackets.

BACKGROUND OF THE INVENTION

Vehicle interiors typically are constructed with a variety of panels that provide aesthetic appeal while also providing some form of energy absorption during an impact event. Such panels include the knee bolster panel attached to the cross-car beam energy absorbing bracket. Other such panels are attached to the vehicle door and to the console.

There are several challenges facing the designers of vehicle interiors. One of these challenges is vehicle safety regulations related to the protection of unbelted front seat occupants. In conjunction with the steering wheel and air bags, the instrument panel itself plays an important role in managing the energy exerted by the occupant during impact. Particularly, energy exerted by the occupant's knees during such impact is an aspect that must be effectively and safely dissipated through proper management. The instrument panel cross-car beam, its associated substrate, and the knee bolster cover together consist of a knee impact energy management system. A knee load target is cascaded to this system, requiring a specific knee load rate, maximum peak and proper knee travel distance. Each component of the system has its essential role and works together to accomplish the stated goals.

Accordingly, a design challenge for interior designers is to properly connect the panel to the bracket of the underlying structure. Adding to this challenge is the fact that while the panels may vary from model to model to support styling needs, very often the underlying brackets and related structure remains relatively unchanged between models, thus the designer must adapt different panels to attach to the same brackets.

Previous solutions required the re-designing and re-tooling of the cross-car beam energy absorbing brackets and related components to bridge the spatial gap between the knee bolster panel and the brackets. Some manufacturers have used foam blocks for this purpose. While providing certain clear advantages, the blocks present at least three difficulties. First, foam blocks are not necessarily the best structure to transfer energy. Second, during assembly foam blocks sometimes are improperly aligned or are inadvertently left out by the assembler. Third, the use of foam blocks adds additional material and assembly cost.

Accordingly the interior designer needs to find a practical, safe and cost-effective solution to the need to adapt different panels to the same instrument panel structure by bridging the spatial gap between the inner side of the panel and the supporting bracket to which it is attached.

SUMMARY OF THE INVENTION

The disclosed invention provides an energy absorbing panel assembly for the interior of a motor vehicle. The energy absorbing panel assembly, typically the knee bolster panel adjacent the steering wheel, includes an energy absorbing structure integrally molded to the panel. The energy absorbing structure includes a pair of outer side walls and a top wall. The outer side walls extend from the same side of the top wall to the panel. Extending from the top wall to the panel is at least one top wall supporting rib. The rib is positioned between the outer side walls. Ordinarily at least two such ribs will be provided.

At least one of the outer walls is at an obtuse angle relative to the plane of the top wall. Both of the outer walls may be at an obtuse angle relative to the plane of the top wall.

In addition to the one or more ribs extending from the top wall to the panel between the outer side walls one or more outer wall-supporting ribs may also be provided extending between the outer side walls and intersecting the top wall supporting rib.

Preferably each of the outer walls has lateral support walls extending outwardly to the panel.

In addition to the knee bolster panel the disclosed invention may find application as well with other interior panels, such as the console panel and the door panel.

The disclosed energy absorbing panel assembly would typically be composed of a polymerized material.

While exemplary embodiments in accordance with the invention are illustrated and disclosed, such disclosure should not be construed to limit the claims. It is anticipated that various modifications and alternative designs may be made without departing from the scope of the invention.

BRIEF DESCRIPTION OF THE DRAWINGS

For a more complete understanding of this invention, reference should now be made to the embodiments illustrated in greater detail in the accompanying drawings and described below by way of examples of the invention wherein:

FIG. 1 is a close up, perspective view of a first embodiment of the molded-in energy absorbing ribbed structure of the disclosed invention;

FIG. 2 is a is a close up, perspective view of a second embodiment the molded-in energy absorbing ribbed structure of the disclosed invention;

DETAILED DESCRIPTION OF THE PREFERRED EMBODIMENT

Figure 3:
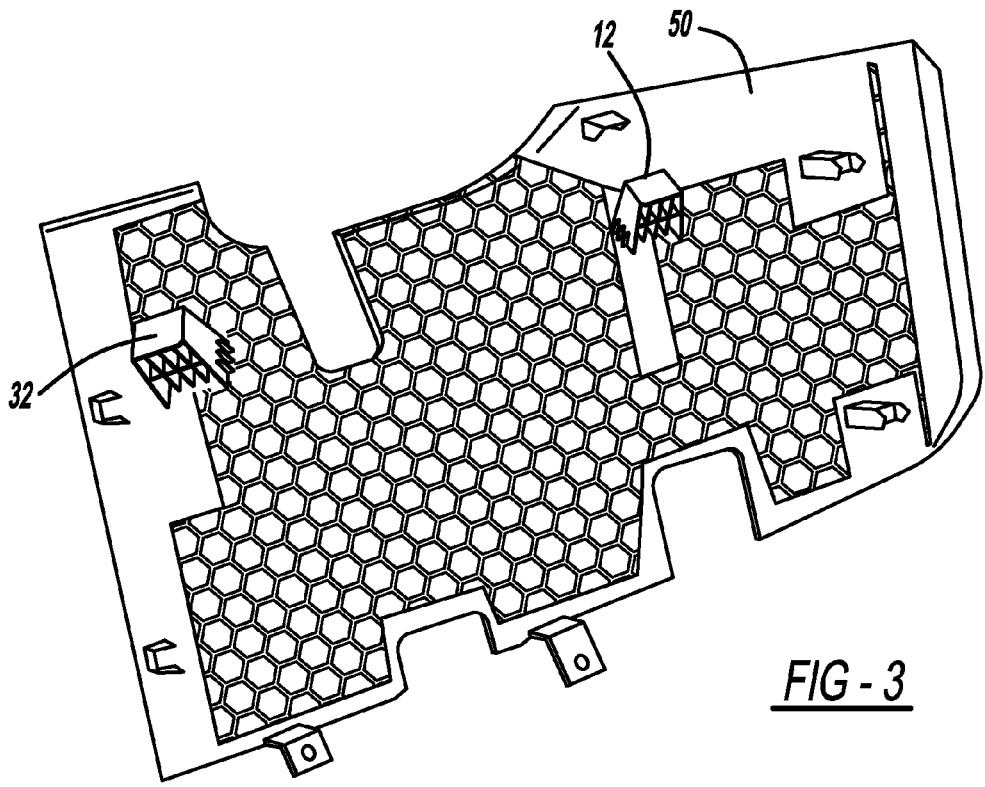
FIG. 3 is a perspective view of the inner side of a steering column cover having the molded-in energy absorbing ribbed structures of the disclosed invention formed thereon.

In the following figures, the same reference numerals will be used to refer to the same components. In the following description, various operating parameters and components are described for different constructed embodiments. These specific parameters and components are included as examples and are not meant to be limiting.

With respect to FIG. 1, an exemplary first embodiment of the disclosed energy absorbing article is generally illustrated as 10. The article 10 includes an energy absorbing structure 12 integrally molded with a panel 14. The panel 14 may be any of several vehicle interior panels, such as the knee bolster panel, the console valence panel, or a door panel. However, while the disclosed invention has particular application for use with the vehicle's knee bolster panel, the energy absorbing structure 12 may find application on any vehicle panel that requires a bridge between the panel and the associated bracket. The energy absorbing article 10 may be composed of any one of a number of polymerized materials familiar to those skilled in the art.

The exemplary first embodiment shown in FIG. 1 illustrates an energy absorbing structure 12 that includes a top wall 16, a first side wall 18, a second side wall 20, and a third side wall 21. The first side wall 18, the second side wall 20, and the third side wall 21 are attached to the panel 14. The upper ends of the first side wall 18, the second side wall 20, and the third side wall 21 are attached to the underside of the top wall 16. As illustrated in FIG. 1 the first side wall 18 is at an obtuse angle relative to the plane of the top wall 16. All three side walls may be at an obtuse angle relative to the plane of the top wall 16.

One or more top wall supporting ribs 22 and 22' are provided between the underside of the top wall 16 and the panel 14. Together with the first side wall 18 and second side wall 20 the top wall supporting ribs 22 and 22' function to dissipate energy in the event of an impact.

One or both of the first side wall 18 and the second side wall 20 of the energy absorbing structure 12 may have lateral supports extending to the panel 14. Particularly, and as illustrated in FIG. 1, lateral support walls 24, 24' and 24" are provided between the first side wall 18 and the panel 14. One or more of the lateral support walls may also be provided on the second side wall 20.

The configuration of the energy absorbing structure 12 shown in FIG. 1 is set forth for illustrative purposes only and is not intended as being limiting. Alternate configurations may be possible without deviating from the spirit of the disclosed invention. Another such configuration of the energy absorbing structure 12 is shown in FIG. 2.

With respect to FIG. 2, an exemplary second embodiment of the disclosed energy absorbing article is generally illustrated as 30. The article 30 includes an energy absorbing structure 32 integrally molded with a panel 34. Like the panel 14 of the embodiment shown in FIG. 1 and discussed in relation thereto, while the panel 34 has particular application as a knee bolster panel, it may be another type of vehicle interior panel, including a console valence panel or a door panel. As with the energy absorbing structure 12 shown in FIG. 1, the energy absorbing structure 32 may find application on any vehicle panel that requires a bridge between the panel and the associated bracket.

The exemplary second embodiment shown in FIG. 2 illustrates an energy absorbing structure 32 that includes a top wall 36, a first side wall 38, a second side wall 40, and a third side wall 41. The first side wall 38, the second side wall 40, and the third side wall 41 are attached to the panel 34. The upper ends of the first side wall 38, the second side wall 40, and the third side wall 41 are attached to the underside of the top wall 36. As illustrated in FIG. 2 at least the second side wall 40 is at an obtuse angle relative to the plane of the top wall 36. All three side walls may be at an obtuse angle relative to the plane of the top wall 36.

As with the first embodiment of FIG. 1, one or more top wall supporting ribs 42, 42' and 42" are provided between the underside of the top wall 36 and the panel 34. In addition, the embodiment of the energy absorbing structure 32 illustrated in FIG. 2 includes at least one side wall supporting rib 44 between the first wall 38 and the second wall 40. The side wall supporting rib 44 intersects the top wall supporting ribs 42, 42' and 42". Together with the first side wall 18, the second side wall 20 and the top wall supporting ribs 22 and 22', the side wall supporting rib 44 functions to dissipate energy in the event of an impact.

Like the energy absorbing structure 12 of FIG. 1, the energy absorbing structure 32 of FIG. 2 may include lateral support walls extending between the side walls 38 and 40 and the panel 34. As illustrated, lateral support walls 46, 46' and 46" extend from the second side wall 40 to the panel 34. One or more of the lateral support walls may also be provided on the first side wall 38.

The first embodiment of the energy absorbing structure of the disclosed invention (represented by the energy absorbing structure 12 illustrated in FIG. 1 and discussed in relation thereto) and the second embodiment of the energy absorbing structure of the disclosed invention (represented by the energy absorbing structure 32 illustrated in FIG. 2 and discussed in relation thereto) may be used singularly, in multiples, or in any conceivable combination on a given panel. This flexibility of application is one of the key features of the disclosed invention.

For example, and with reference to FIG. 3, a knee bolster panel 50 is illustrated. The knee bolster panel 50 is typically fitted beneath the steering column in the vehicle interior. The knee bolster panel 50 includes both the first embodiment of the energy absorbing structure of the disclosed invention (energy absorbing structure 12) and the second embodiment of the energy absorbing structure of the disclosed invention (energy absorbing structure 32). The illustrated knee bolster panel 50 and its associated energy absorbing structures is provided for illustrative purposes only and are not intended as being limiting. Many variations in size, shape, number and type of energy absorbing structure are possible without deviating from the spirit and scope of the disclosed invention.

Figure 4:
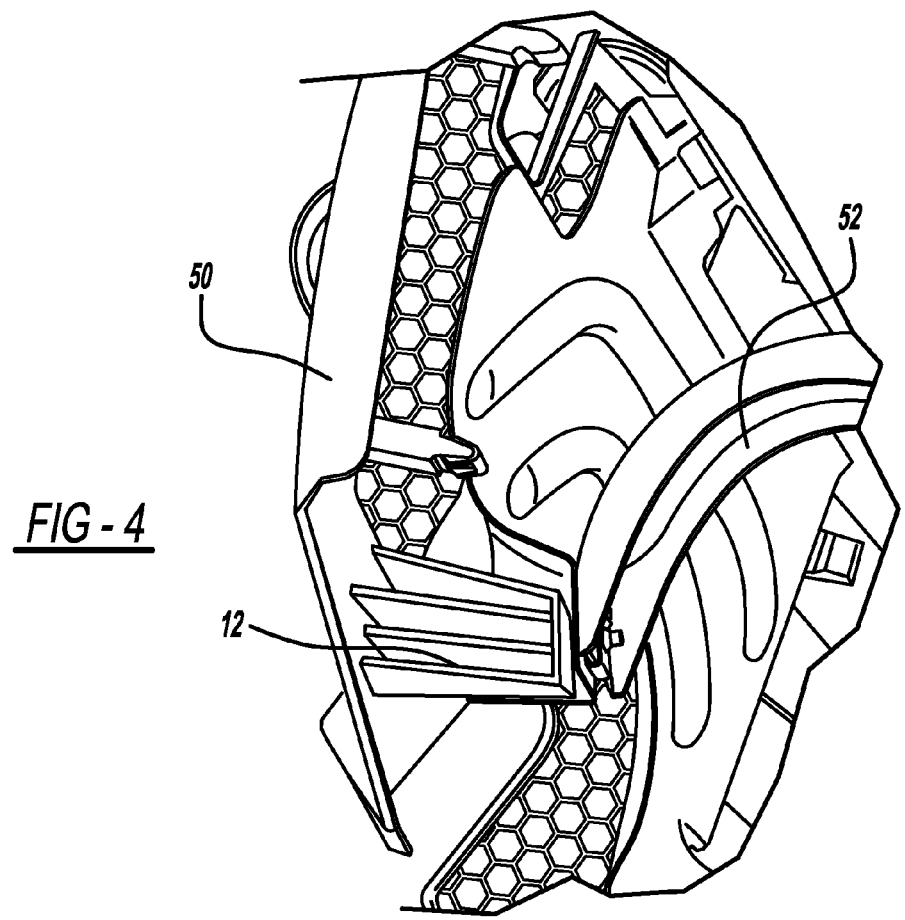
FIG. 4 is a perspective view illustrating the relationship between the steering column cover of FIG. 3 and the steering column cover support bracket.

FIG. 4 illustrates how a panel incorporating the energy absorbing structures of the disclosed invention may be fitted to the underlying vehicle structure. Particularly, a typical cantilevered energy absorbing bracket 52 connected to a cross-car beam (not shown) is illustrated. The energy absorbing structure 12 of the panel 50 is attached directly to the energy absorbing bracket 52 and readily takes up the space between the panel and the bracket.

As specified above, the energy absorbing structure of the disclosed invention is not limited to use with a knee bolster panel, although that application is primary. Instead, the energy absorbing structure may be used with other panels, such as those shown in FIGS. 5 through 8.

Figure 5:
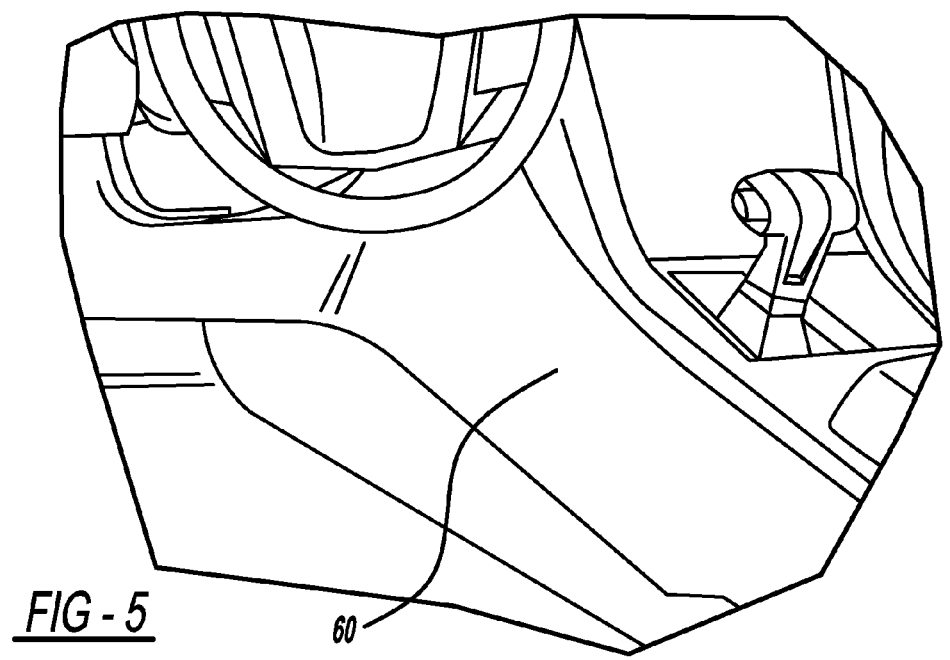
FIG. 5 is a perspective view of the outer side of the driver's side console valence side panel.
Figure 6:
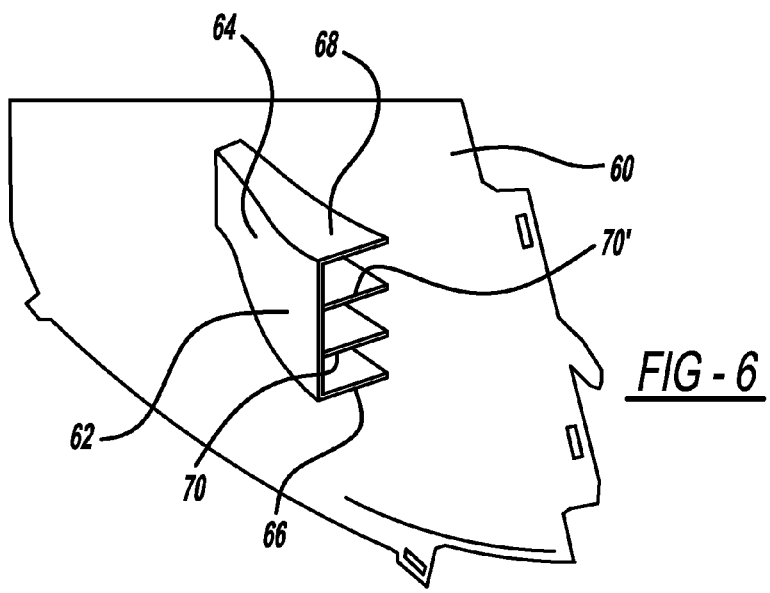
FIG. 6 is a perspective view of the inner side of the driver's side console valence side panel of FIG. 5 showing a molded-in energy absorbing ribbed structure.

With respect first to FIGS. 5 and 6, a driver's side console valence panel 60 is shown in place within the interior of a typical vehicle. The valence panel 60 is shown for illustrative purposes only and is not intended as being limiting. On the back side of the valence panel 60 is provided an energy absorbing structure 62. The energy absorbing structure 62 includes a top wall 64, a first side wall 66, and a second side wall 68. At least two top wall supporting ribs 70 and 70' are provided between the top wall 64 and the panel 60. Together with the top wall 64, the first side wall 66, and the second side wall 68 the top wall supporting ribs 70 and 70' function to dissipate energy in the event of an impact.

Figure 7:
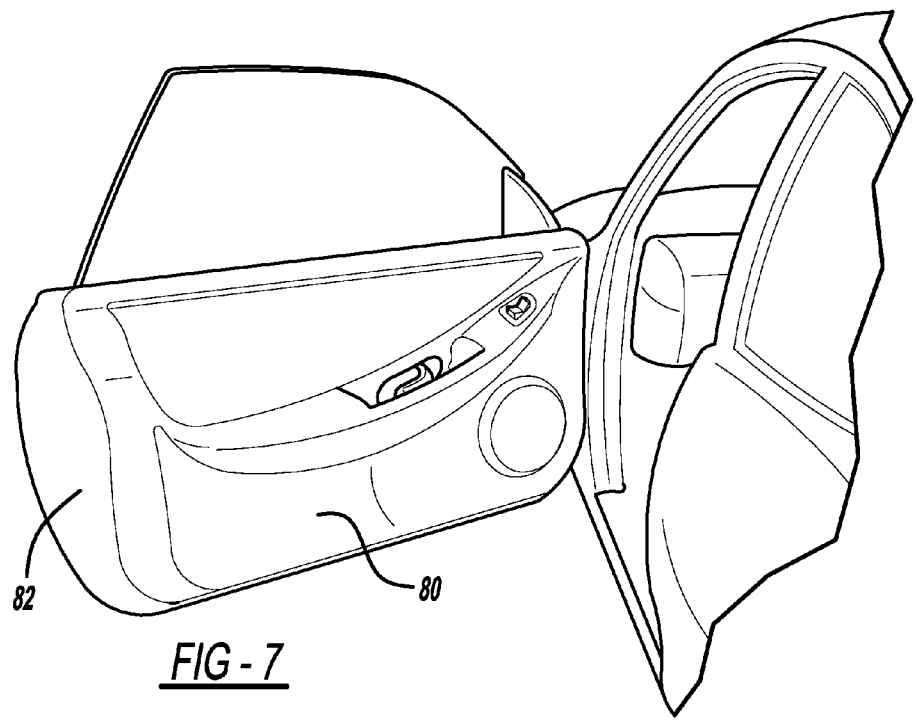
FIG. 7 is a perspective view of the outer side of a driver's door foot panel.

With respect to FIG. 7, a door panel 80 is shown in place fitted to a vehicle door 82. The door panel 80 is shown for illustrative purposes only and is not intended as being limiting.

Figure 8:
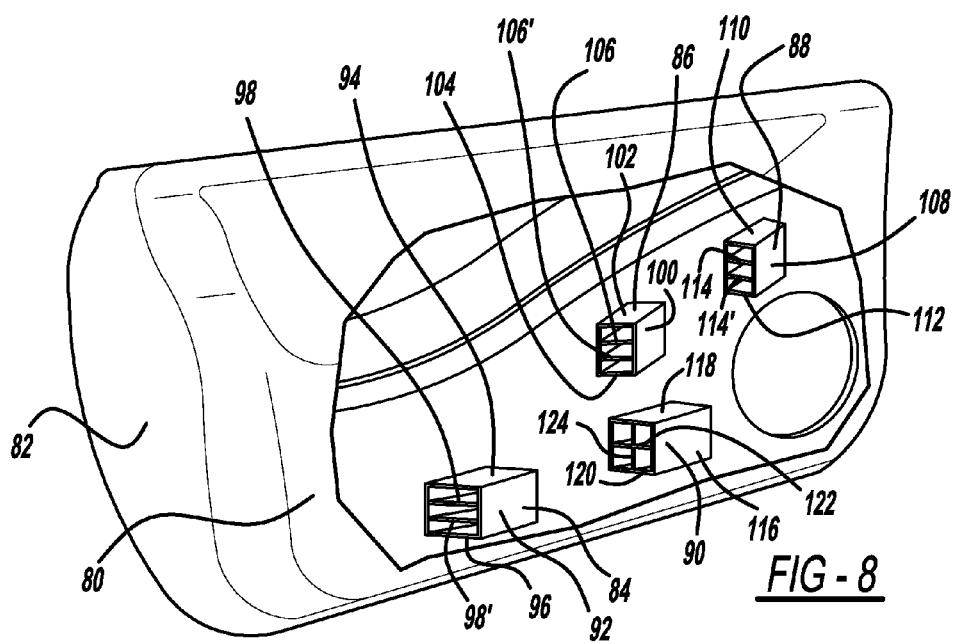
FIG. 8 is a perspective view of the inner side of the driver's door foot panel of FIG. 7 showing a pair of molded-in energy absorbing ribbed structures.

On the back side of the door panel 80 are provided a plurality of energy absorbing structures according to the disclosed invention. A suggested array of these structures is illustrated in FIG. 8 which represents a sectional view of the vehicle door 82 showing a portion of the door panel 80 stripped away.

The structures include a first energy absorbing structure 84, a second energy absorbing structure 86, a third energy absorbing structure 88, and a fourth energy absorbing structure 90. The number, placement and configuration of the structures 84, 86, 88, and 90 shown in FIG. 8 are set forth for illustrative purposes only and are not intended as being limiting.

The first energy absorbing structure 84 comprises a top wall 92, a first side wall 94, a second side wall 96, and a third side wall (not visible from this view). At least two top wall supporting ribs 98 and 98' are provided between the top wall 92 and the panel 80. Together with the top wall 92, the first side wall 94, the second side wall 96, and the third side wall the top wall supporting ribs 98 and 98' function to dissipate energy in the event of an impact.

Similarly, the second energy absorbing structure 86 comprises a top wall 100, a first side wall 102, a second side wall 104, and a third side wall (again not visible from this view). At least two top wall supporting ribs 106 and 106' are provided between the top wall 100 and the panel 80. Together with the top wall 100, the first side wall 102, the second side wall 104, and the third side wall the top wall supporting ribs 106 and 106' function to dissipate energy in the event of an impact.

The third energy absorbing structure 88 comprises a top wall 108, a first side wall 110, a second side wall 112, and a third side wall (not visible from this view). At least two top wall supporting ribs 114 and 114' are provided between the top wall 108 and the panel 80. Together with the top wall 108, the first side wall 110, the second side wall 112, and the third side wall the top wall supporting ribs 114 and 114' function to dissipate energy in the event of an impact.

The fourth energy absorbing structure 90 represents an alternate embodiment of the energy absorbing structure and is along the lines of the structure 30 shown in FIG. 2 and discussed in relation thereto, whereas the first energy absorbing structure 84, the second energy absorbing structure 86, and the third energy absorbing structure 88 are similar to the structure 10 shown in FIG. 1 and discussed in relation thereto.

Accordingly, the fourth energy absorbing structure 90 comprises a top wall 116, a first side wall 118, a second side wall 120, and a third side wall (not shown from this view). At least one top wall supporting rib 122 is provided between the top wall 116 and the panel 80. In addition, a side wall supporting rib 124 is provided between the first side wall 118 and the second wide wall 120. Together with the top wall 116, the first side wall 118, the second side wall 120, and the third side wall, the top wall supporting rib 122 and the side wall supporting rib 124 function to dissipate energy in the event of an impact.

According to the disclosed invention, as the knee impacts the knee bolster cover in a crash event the initial load is dissipated into the ribbing structure inside the energy absorbing structure. The ribbing pattern, including the number of ribs and their orientation, was carefully configured to meet both tooling feasibility requirements and energy management needs. Test results verified that the functional performance of the disclosed invention demonstrated that the initial load of the test occupant's knees met the cascaded target.

In addition to satisfactory test results, the disclosed invention provides other advantages. First, the design of the panel itself can be readily modified to meet the demands of different interior configurations while eliminating the need to re-configure the cross-car beam energy absorbing brackets from interior design to interior design. Second, the mold-in design provides the cover panel itself with the energy absorption function and thus eliminates the need for additional components (such as the presently-used foam block), thus saving tooling and production cost. Third, by eliminating the additional component (again, such as the presently used foam block), the risk of failing to include the component during assembly is entirely eliminated as is the need for either an additional check or control plan.

The foregoing discussion discloses and describes exemplary embodiments of the present invention. One skilled in the art will readily recognize from such discussion, and from the accompanying drawings and claims that various changes, modifications and variations can be made therein without departing from the true spirit and fair scope of the invention as defined by the following claims.

What is claimed is:

1. A vehicle knee bolster panel comprising:
   a panel portion that attaches to an end of a cantilevered support bracket, the panel portion including an inside surface that faces towards the cantilevered support bracket;
   an energy absorbing portion integrally molded to the inside surface at a position that is aligned with the end of the cantilevered support bracket when the panel portion is attached to the cantilevered support bracket, said energy absorbing portion having a top wall with a plane, three side walls extending from the same side of said top wall, one of said side walls being at an obtuse angle relative to said plane; and
   a rib extending from said top wall to said panel portion between said walls.

2. The vehicle knee bolster panel of claim 1 wherein all three of said side walls are at an obtuse angle relative to said top wall.

3. The vehicle knee bolster panel of claim 1 wherein said rib extending from said top wall to said panel portion between said walls is two top wall spaced apart supporting ribs extending from said top wall to said panel portion.

4. The vehicle knee bolster panel of claim 1, wherein the inside surface of the panel portion is spaced a distance apart from the support bracket when the panel portion is attached to the support bracket, wherein the energy absorbing portion includes a height measured from the inside surface to the top wall, and wherein the height bridges the distance between the inside surface and the support bracket.

5. An energy absorbing component for a vehicle interior comprising:
   an energy absorbing panel that attaches to a support bracket and beneath a steering column of the vehicle interior, wherein the energy absorbing panel includes an inside surface that is spaced a distance apart from the support bracket when the energy absorbing panel is attached to the support bracket;
   an energy absorbing structure integrally molded to said inside surface at a position that is aligned with the support bracket when the energy absorbing panel is attached to the support bracket, said structure including three side walls, a top wall having a plane from which said side walls extend, at least one of said side walls being at an obtuse angle relative to said top wall, said structure further including a supporting rib extending from said top wall between said side walls, wherein the energy absorbing structure bridges a space between the inside surface and the support bracket.

6. The energy absorbing component of claim 5 wherein all three of said side walls are at an obtuse angle relative to said top wall.

7. The energy absorbing component of claim 5 wherein each of said side walls has an outer side, said structure further including a lateral support wall extending outwardly from said outer side of at least one side wall.

8. The energy absorbing component of claim 5 including two top wall supporting ribs extending from said top wall.

9. The energy absorbing component of claim 5 wherein said energy absorbing panel is a knee bolster panel.

10. The energy absorbing structure of claim 5 wherein said panel and said structure are molded from a polymerized material.

11. An energy absorbing structure molded to a panel of a vehicle interior, the structure comprising:
- a first side wall, a second side wall, and a third side wall that are molded to an inside surface of the panel, wherein the inside surface faces a support bracket to which the panel is attached and wherein the inside surface is spaced a distance apart from the support bracket;
- a top wall, said top wall having a panel-facing side and a bracket-facing side, wherein the bracket-facing side is aligned with the support bracket to which the panel is attached; and
- a pair of spaced apart top wall support ribs, said side walls and said ribs extending from said panel-facing side of said top wall between said side walls, said ribs being between said side walls, wherein the side walls substantially bridge the distance between the inside surface of the panel and the bracket.

12. The energy absorbing structure of claim 11 wherein said top wall has a plane and wherein at least one of said side walls is at an obtuse angle relative to said plane of said top wall.

13. The energy absorbing structure of claim 11 wherein at least two of said side walls are at an obtuse angle relative to said plane of said top wall.

14. The energy absorbing structure of claim 11 wherein each of said side walls has an outer side, said structure further including a lateral support wall extending outwardly from said outer side of at least one side wall.

15. The energy absorbing structure of claim 11 wherein said structure is molded from a polymerized material.

\* \* \* \* \*